(12) United States Patent  
Baatout et al.

(10) Patent No.: US 11,947,573 B2  
(45) Date of Patent: Apr. 2, 2024

(54) DETERMINING ZONE IDENTIFICATION RELIABILITY

(71) Applicant: Content Square SAS, Paris (FR)

(72) Inventors: Mohamed-Amine Baatout, Paris (FR); Paul Coursaux, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/877,707

(22) Filed: Jul. 29, 2022

(65) Prior Publication Data

US 2023/0350922 A1 Nov. 2, 2023

Related U.S. Application Data

(60) Provisional application No. 63/336,831, filed on Apr. 29, 2022.

(51) Int. Cl.  
*G06F 16/00* (2019.01)  
*G06F 16/28* (2019.01)  
*G06F 16/901* (2019.01)

(52) U.S. Cl.  
CPC .......... *G06F 16/285* (2019.01); *G06F 16/282* (2019.01); *G06F 16/9027* (2019.01)

(58) Field of Classification Search  
CPC ... G06F 16/285; G06F 16/282; G06F 16/9027  
See application file for complete search history.

(56) References Cited

U.S. PATENT DOCUMENTS

| | | | |
|---|---|---|---|
| 2005/0198299 A1* | 9/2005 | Beck | G06Q 10/107 709/225 |
| 2015/0106096 A1* | 4/2015 | Toopran | G10L 15/193 704/244 |
| 2019/0317949 A1* | 10/2019 | Florissi | G06F 16/2471 |
| 2021/0406337 A1* | 12/2021 | Frikha | G06F 16/986 |

(Continued)

FOREIGN PATENT DOCUMENTS

WO  2023209638  11/2023

OTHER PUBLICATIONS

Randriamasy, Sabine, Luc M. Vincent, and Ben S. Wittner. "Automatic benchmarking scheme for page segmentation." Document Recognition. vol. 2181. SPIE, 1994.*

(Continued)

*Primary Examiner* — Nan Hutton  
(74) *Attorney, Agent, or Firm* — Schwegman Lundberg & Woessner, P.A.

(57) ABSTRACT

Aspects of the present disclosure involve a system comprising a computer-readable storage medium storing a program and method for determining zone identification reliability. The program and method provide for receiving plural page samples of a webpage or page group, each page sample of the plural page samples corresponding to a respective pageview of the webpage or page group; determining, for each page sample of the plural page samples, zone identification information for the page sample, the zone identification information indicating targets and zones identified by the targets for the page sample; detecting any identification (Continued)

errors with respect to the zone identification information for the plural page samples; and determining, based on the detecting, a reliability of the zone identification information.

18 Claims, 9 Drawing Sheets

(56) References Cited

U.S. PATENT DOCUMENTS

2022/0036477 A1    2/2022  Diaz et al.
2022/0043879 A1    2/2022  Trigalo et al.

OTHER PUBLICATIONS

Yin, Xinyi, and Wee Sun Lee. "Using link analysis to improve layout on mobile devices." Proceedings of the 13th international conference on World Wide Web. 2004.*
"International Application Serial No. PCT IB2023 054390, International Search Report dated Oct. 19, 2023", 3 pgs.
"International Application Serial No. PCT IB2023 054390, Written Opinion dated Oct. 19, 2023", 8 pgs.

* cited by examiner

US 11,947,573 B2

DETERMINING ZONE IDENTIFICATION RELIABILITY

CLAIM OF PRIORITY

This application claims the benefit of priority of U.S. Provisional Application Ser. No. 63/336,831, filed Apr. 29, 2022, which is hereby incorporated by reference in its entirety.

TECHNICAL FIELD

The present disclosure relates generally to web session analysis, including determining zone identification reliability.

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Web analysis solutions provide for the collection and analysis of website data. Example web analysis tools include the tracking and recording of session events corresponding to user interactions, automated website zone identification, session replay, statistical analysis of collected data, and the like.

As webpages may include dynamic content (e.g., blocks configured to display banner ads of various sizes), the pageviews of a given webpage or page group may vary between viewing sessions, devices, users, and combinations thereof. Such variance in pageviews may lead to zone target misidentification, resulting in reduced reliability for zone identification information. The disclosed embodiments provide for determining the reliability of zone identification information.

The disclosed embodiments as described herein provide for experience analytics system configured to determine, for each page sample of a set of representative page samples, zone identification information for the page sample. The zone identification information indicates targets and zones identified by the targets for the page sample. The experience analytics system detects any identification errors with respect to the zone identification information for the plural page samples. For example, the experience analytics system performs hierarchical clustering based on the zone identification information for the plural page samples, the hierarchical clustering resulting in a tree diagram in which the zones identified by the targets are arranged in one or more clusters. In response, a reliability of the zone identification information is determined and presented for display to an end user.

Networked Computing Environment

Figure 1:
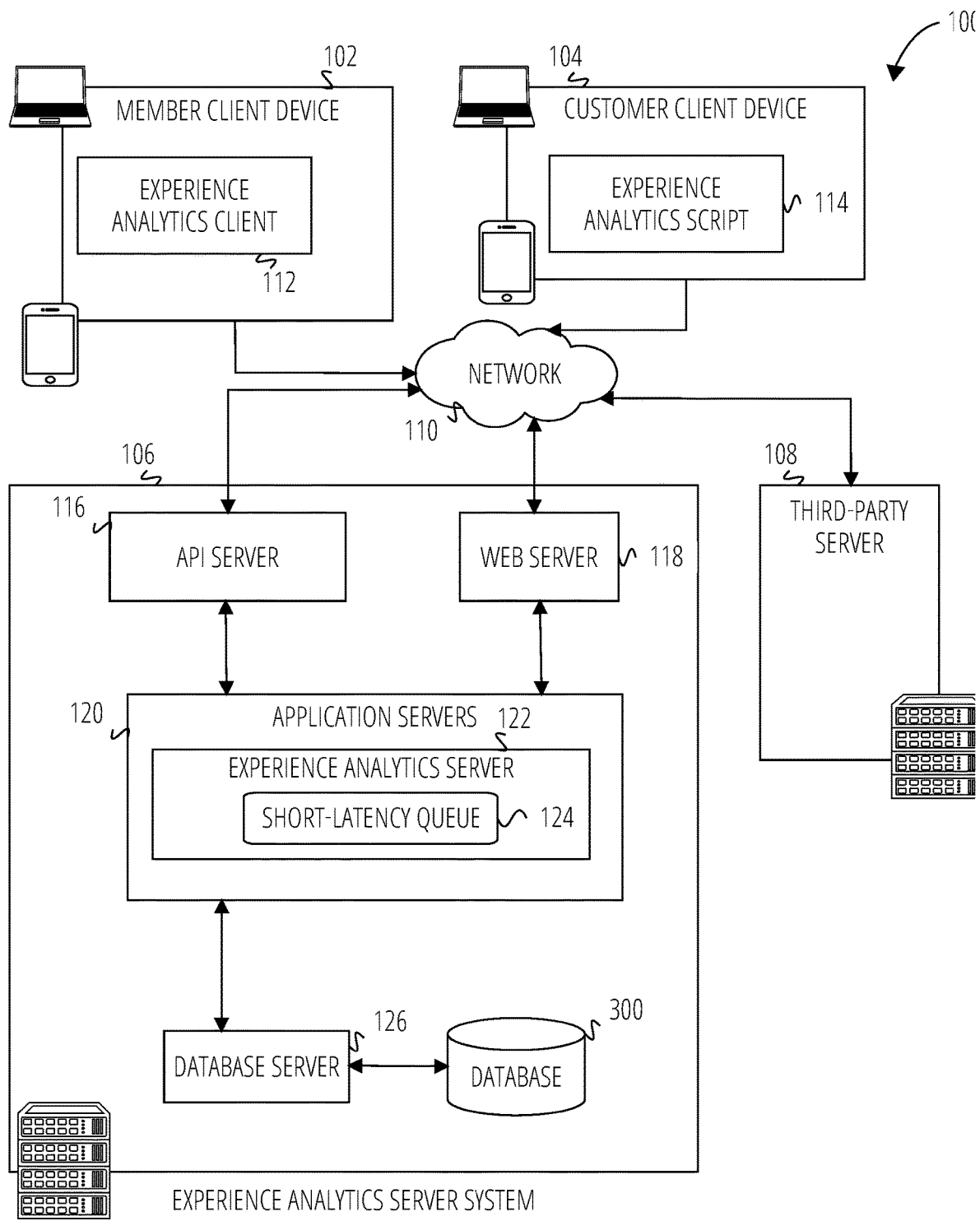
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 104, and multiple instances of a third-party server 108.

The member client device 102 is associated with a client of the experience analytics system 100, where the client that has a website hosted on the client's third-party server 108. An agent of the client (e.g., a web administrator, an employee, an operator, etc.) can be the user of the member client device 102.

Each of the member client devices 102 hosts a number of applications, including an experience analytics client 112. Each experience analytics client 112 is communicatively coupled with an experience analytics server system 106 and third-party servers 108 via a network 110 (e.g., the Internet). An experience analytics client 112 can also communicate with locally-hosted applications using Applications Program Interfaces (APIs).

The member client devices 102 and the customer client devices 104 can also host a number of applications including Internet browsing applications (e.g., Chrome, Safari, etc.). The experience analytics client 112 can also be implemented as a platform that is accessed by the member client device 102 via an Internet browsing application or implemented as an extension on the Internet browsing application.

Users of the customer client device 104 can access client's websites that are hosted on the third-party servers 108 via the network 110 using the Internet browsing applications. For example, the users of the customer client device 104 can navigate to a client's online retail website to purchase goods or services from the website.

The third-party server 108 may include data relating to websites, data relating to webpages, other, like, data, and any combination thereof. The third-party server 108 may be a local web source(s), remote web source(s), or any combination thereof, including a cloud-based network(s), distributed network(s), and the like. Examples of the third-party server 108 include, but are not limited to, repositories of webpage information, repositories of webpage element or zone information, servers configured to provide "live" webpages, other, like, sources, and any combination thereof.

While a user of the customer client device 104 is navigating a client's website on an Internet browsing application, the Internet browsing application on the customer client device 104 can also execute a client-side script (e.g., JavaScript (.*js)) such as an experience analytics script 114. In one example, the experience analytics script 114 is hosted on the third-party server 108 with the client's website and processed by the Internet browsing application on the customer client device 104. The experience analytics script 114 can incorporate a scripting language (e.g., a .*js file or a .json file).

In certain examples, a client's native application (e.g., ANDROID™ or IOS™ Application) is downloaded on the customer client device 104. In this example, the client's native application including the experience analytics script 114 is programmed in JavaScript leveraging a Software Development Kit (SDK) provided by the experience analytics server system 106. The SDK includes Application Programming Interfaces (APIs) with functions that can be called or invoked by the client's native application.

In one or more embodiments, the experience analytics script 114 is configured to collect activity relating to a client's interaction with the third-party server 108 content through a webpage displayed on the customer client device 104. In one example, the experience analytics script 114 records data including the changes in the interface of the webpage being displayed on the customer client device 104, the elements on the webpage being displayed or visible on the interface of the customer client device 104, the text inputs by the user into the webpage, a movement of a mouse (or touchpad or touch screen) cursor, user scrolls, and mouse (or touchpad or touch screen) clicks on the interface of the webpage. In addition, and with proper user permissions, the experience analytics script 114 may be configured to collect activity data features including, customer client device 104 type, website/application type, customer client device 104 geolocation, customer client device 104 internet protocol (IP) address, uniform resource locators (URLs) accessed by the customer client device 104, customer client device 104 screen resolution, and/or referrer URLs.

The experience analytics script 114 transmits the data to the experience analytics server system 106 via the network 110. In another example, the experience analytics script 114 transmits the data to the third-party server 108 and the data can be transmitted from the third-party server 108 to the experience analytics server system 106 via the network 110. As such, the experience analytics script 114 is configured to collect activity relating to a client's interaction with web server content (e.g., content from the third-party server 108) through a webpage displayed on the customer client device 104.

In one or more embodiments, the experience analytics script 114 may be included within the source code of a webpage, such as the hypertext markup language (HTML) code underlying such a webpage, where such source code is hosted by the third-party server 108 (e.g., web server). Where a user of the customer client device 104 connects to the third-party server 108 and requests to visit a given webpage, the underlying code for the webpage is downloaded to the customer client device 104 and rendered thereupon, including the experience analytics script 114, providing for user interaction with the webpage, as well as for data collection by the experience analytics script 114.

In one or more embodiments, the member client device 102 includes an experience analytics client 112. The experience analytics client 112 is a platform, program, service, or the like, configured to provide help agents, and the like, with the ability to view details of a live session. For example, the experience analytics client 112 is configured to provide user interfaces to display one or more features of a live session, including, without limitation, live session events, historical replay data, and the like, as well as any combination thereof. The experience analytics client 112 may be configured to provide a help agent with a unique per-session view, the unique per-session view corresponding to a single user's current session. The experience analytics client 112 may be configured to provide the unique view upon the help agent's activation of a unique link (e.g., a live session link), where such a unique link may be sent to the member client device 102 upon a user's interaction with a "live support" or similar button or feature, as may be included in a webpage which a user is visiting on the customer client device 104.

The experience analytics client 112 may be further configured to identify, based on the contents of the unique link, one or more relevant live replay data features including, without limitation, live session events, historical recorded events, and the like, and to collect, receive, or otherwise access such data features. Specifically, the experience analytics client 112 may be configured to access live session events by opening a connection to a short-latency queue (SLQ) 124.

In addition, the experience analytics client 112 may be configured to collect or receive data relevant to one or more previous sessions including, as examples and without limitation, session replays, session replay analytics, and the like. The experience analytics client 112 may be configured to provide for collection, receipt, or the like, of such data, as may be relevant to such previous sessions, from one or more sources including, without limitation, the database 300, and the like, as well as any combination thereof.

Following collection, receipt, or the like, of live and historical session data, the experience analytics client 112 provides for displaying user interface(s) with one or more of such data features to a help agent, providing for agent review of current and historical session data. Such presentation, through the member client device 102, provides for short-term view of session data combined with long-term persistent view of session data. In this regard, data exchanged between the experience analytics client 112 and the experience analytics server system 106 may include functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 106 supports various services and operations that are provided to the experience analytics client 112. Such operations include transmitting data to and receiving data from the experience analytics client 112. Data exchanges to and from the experience analytics server system 106 are invoked and controlled through functions available via user interfaces (UIs) of the experience analytics client 112.

The experience analytics server system 106 provides server-side functionality via the network 110 to a particular experience analytics client 112. While certain functions of the experience analytics system 100 are described herein as being performed by either an experience analytics client 112 or by the experience analytics server system 106, the location of certain functionality either within the experience analytics client 112 or the experience analytics server system 106 may be a design choice. For example, it may be technically preferable to initially deploy certain technology and functionality within the experience analytics server system 106 but to later migrate this technology and functionality to the experience analytics client 112 where a member client device 102 has sufficient processing capacity.

Turning now specifically to the experience analytics server system 106, an Application Program Interface (API) server 116 is coupled to, and provides a programmatic interface to, application servers 120. The application servers 120 are communicatively coupled to a database server 126, which facilitates access to a database 300 that stores data associated with experience analytics processed by the application servers 120. Similarly, a web server 118 is coupled to the application servers 120, and provides web-based interfaces to the application servers 120. To this end, the web server 118 processes incoming network requests over the Hypertext Transfer Protocol (HTTP) and several other related protocols.

The Application Program Interface (API) server 116 receives and transmits message data (e.g., commands and message payloads) between the member client device 102 and the application servers 120. Specifically, the Application Program Interface (API) server 116 provides a set of interfaces (e.g., routines and protocols) that can be called or queried by the experience analytics client 112 or the experience analytics script 114 in order to invoke functionality of the application servers 120. The Application Program Interface (API) server 116 exposes to the experience analytics client 112 various functions supported by the application servers 120, including generating information on errors, insights, merchandising information, adaptability information, images, graphs providing visualizations of experience analytics, session replay videos, zoning and overlays to be applied on the website, etc.

The application servers 120 host a number of server applications and subsystems, including for example an experience analytics server 122. The experience analytics server 122 implements a number of data processing technologies and functions, particularly related to the aggregation and other processing of data including the changes in the interface of the website being displayed on the customer client device 104, the elements on the website being displayed or visible on the interface of the customer client device 104, the text inputs by the user into the website, a movement of a mouse (or touchpad) cursor and mouse (or touchpad) clicks on the interface of the website, etc. received from multiple instances of the experience analytics script 114 on customer client devices 104. The experience analytics server 122 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 122, in view of the hardware requirements for such processing.

In one or more embodiments, the experience analytics server 122 is configured to execute instructions for streaming live sessions (e.g., live browsing sessions). As is relevant to the execution of instructions for streaming live sessions, live sessions are real-time or near-real-time representations of user journeys through a webpage or set of webpages, including the users' interactions therewith.

The experience analytics server 122 may be configured to activate a "live mode" or other, similar, program, routine, or the like, in response to the receipt, collection, or the like, of one or more "live mode" trigger commands, instructions, or the like, as may be sent by the experience analytics script 114, as described above. Such "live mode" routines may include, without limitation, increasing session event processing frequency, initiating one or more post-to-SLQ processes, such as may be applicable to the population of the short-latency queue (SLQ) 118 with live replay events and data, and the like.

The SLQ 124 may provide for collection, receipt, or the like, of session events, including session events in the order of collection or receipt. The SLQ 124 is a memory, storage, or other, like, component, configured to provide real-time or near-real-time storage of session events, such as clicks, scrolls, text entries, and the like, in the order in which such session events are generated during a user's session, as well as subsequent retrieval or transmission of such stored events, including in order, in real-time or near-real-time, as described hereinbelow. The SLQ 124 may be configured as a virtual component, as a physical component, or in a hybrid physical-virtual configuration.

In one or more embodiments, the database 300 is configured to archive data permanently or semi-permanently. The database 300 may be configured to store information received from one or more web third-party servers 108 (e.g., based on a request from the experience analytics server 122 to the third-party servers 108 for information, such as webpage content), customer client devices 104, and other, like, components, as well as to store data relevant to the operation of the experience analytics server 122 and any outputs therefrom. The database 300 may be a local system, a remote system, or a hybrid remote-local system. Further, the database 300 may be configured as a fully-physical system, including exclusively physical components, as a virtualized system, including virtualized components, or as a hybrid physical-virtual system. Examples of devices which may be configured as a database 300 in the experience analytics system 100 include, without limitation, local database hardware, cloud storage systems, remote storage servers, other, like, devices, and any combination thereof. Further, the database 300 may be directly connected to the experience analytics server 122, such as without an intermediate connection to the network 110, including via connections similar or identical to those described with respect to the network 110.

In one or more embodiments, the database 300 may be configured to store or otherwise archive data relating to one or more sessions, including, without limitation, user interactions, user sessions, other, like, data, and any combination thereof. Further, the database 300 may be configured to transfer, to and from the experience analytics server 122, data necessary for the execution of the methods described herein, and may store or otherwise archive experience analytics server 122 inputs, experience analytics server 122 outputs, or both.

As an example of a potential use-case involving the experience analytics system 100, as may be relevant to the descriptions provided herein, a user may attempt to access a website to purchase a product. The user may, through the customer client device 104, and a browser app included therein, generate a request to access the website. The request, when received by the third-party server 108, may configure the third-party server 108 to send a copy of webpage(s) of the website to the customer client device 104, including the experience analytics script 114. The database 300 may store a copy of the webpage(s) from the third-party servers 108 (e.g., based on a request from the experience analytics server 122 to the third-party servers 108). The experience analytics server 122 may provide such copy to the customer client device 104. During the course of the customer client's session, the experience analytics script 114 may collect session data and transmit such data to the experience analytics server 122 for storage in the database 300.

In addition, where the user at the customer client device 104 encounters an issue (e.g., an error such a defective checkout button, user confusion, and/or another type of issue), the user may engage a live help support feature (e.g., implemented by the experience analytics server 122), for example, by selecting a chat button. In this regard, the help support feature includes a chat component, which allows a support agent at the member client device 102 to chat with the user at the customer client device 104. Moreover, the help support feature allows the user to connect with the help agent, causing the experience analytics script 114 to employ a script interface (e.g., a Javascript API) to make data available for the member client device 102 (e.g., such that when the live session link/button is pressed, this data is visible to the agent), and to send a live mode trigger to the experience analytics server system 106. Following receipt of the live mode trigger by the experience analytics server system 106, the user's session data may be pushed to the SLQ 124 of the experience analytics server 122, in real-time or near-real-time. The experience analytics server 122 sends the live session link to the member client device 102, where the live session link is selectable by the help agent.

Following a help agent's activation of the live session link, the experience analytics server 122 may be configured to provide live session replay to the member client device 102. For example, the experience analytics server 122 generates a combined SLQ 124 and database 300 data feed, and provides the combined data feed to the help agent at the member client device 102, in real-time or near-real-time, permitting the help agent to view the user's live session, and provide suggestions regarding how the user can better engage with the website. The merging allows the help agent to seek back (e.g., rewind) to view what happened, even before the website visitor at the customer client device 104 pressed the chat button.

System Architecture

Figure 2:
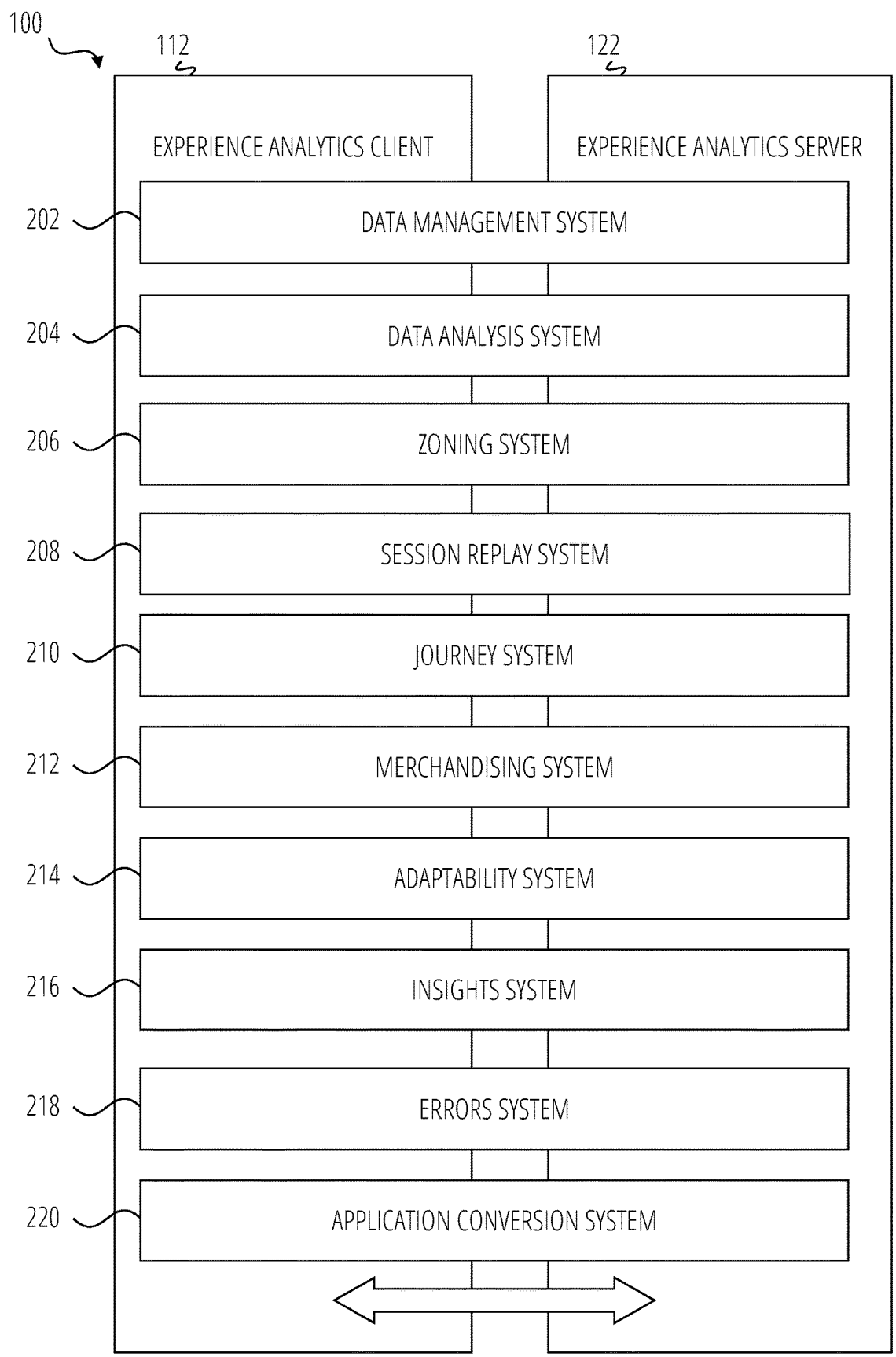
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 112 and the experience analytics server 122. The experience analytics system 100 embodies a number of subsystems, which are supported on the client-side by the experience analytics client 112 and on the server-side by the experience analytics server 122. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the processors 904, the experience analytics script 114 executed by each of the customer client devices 104, and the third-party servers 108.

The data management system 202 is also responsible for exporting data to the processors 904 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the processors 904 via the experience analytics client 112. The zoning interface provides a visualization of how the users via the customer client devices 104 interact with each element on the client's website. The zoning interface can also provide an aggregated view of in-page behaviors by the users via the customer client device 104 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the processors 904. In one example, the data can be generated using information from the data analysis system 204.

The session replay system 208 is responsible for generating the session replay interface to be displayed by the processors 904 via the experience analytics client 112. The session replay interface includes a session replay that is a video reconstructing an individual user's session (e.g., visitor session) on the client's website. The user's session starts when the user arrives into the client's website and ends upon the user's exit from the client's website. A user's session when visiting the client's web site on a customer client device 104 can be reconstructed from the data received from the user's experience analytics script 114 on customer client devices 104. The session replay interface can also include the session replays of a number of different visitor sessions to the client's website within a period of time (e.g., a week, a month, a quarter, etc.). The session replay interface allows the client via the processors 904 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the processors 904 via the experience analytics client 112. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 104) to the website, and illustrates the visited pages and in order in which the pages were visited. The client viewing the journey interface on the processors 904 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the processors 904 via the experience analytics client 112. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 104 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 114 to determine whether an accessibility-enhanced version of the client's website is needed, and can generate the accessibility-enhanced version of the client's website to be displayed by the customer client device 104.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the processors 904 via the experience analytics client 112 on a dashboard of a user interface, as a pop-up element, as a separate panel, etc. In this example, the insights system 216 is responsible for generating an insights interface to be displayed by the processors 904 via the experience analytics client 112. In another example, the insights can be incorporated in another interface such as the zoning interface, the session replay, the journey interface, or the merchandising interface to be displayed by the processors 904.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 104 visiting the client's website). The errors can also include causes of looping behaviors by the users, in-page issues such as unresponsive calls to action and slow loading pages, etc. The errors can be displayed by the processors 904 via the experience analytics client 112 on a dashboard of a user interface, as a pop-up element, as a separate panel, etc. In this example, the errors system 218 is responsible for generating an errors interface to be displayed by the processors 904 via the experience analytics client 112. In another example, the insights can be incorporated in another interface such as the zoning interface, the session replay, the journey interface, or the merchandising interface to be displayed by the processors 904.

The application conversion system 220 is responsible for the conversion of the functionalities of the experience analytics server 122 as provided to a client's website to a client's native mobile applications. For instance, the application conversion system 220 generates the mobile application version of the zoning interface, the session replay, the journey interface, the merchandising interface, the insights interface, and the errors interface to be displayed by the processors 904 via the experience analytics client 112. The application conversion system 220 generates an accessibility-enhanced version of the client's mobile application to be displayed by the customer client devices 104.

Data Architecture

Figure 3:
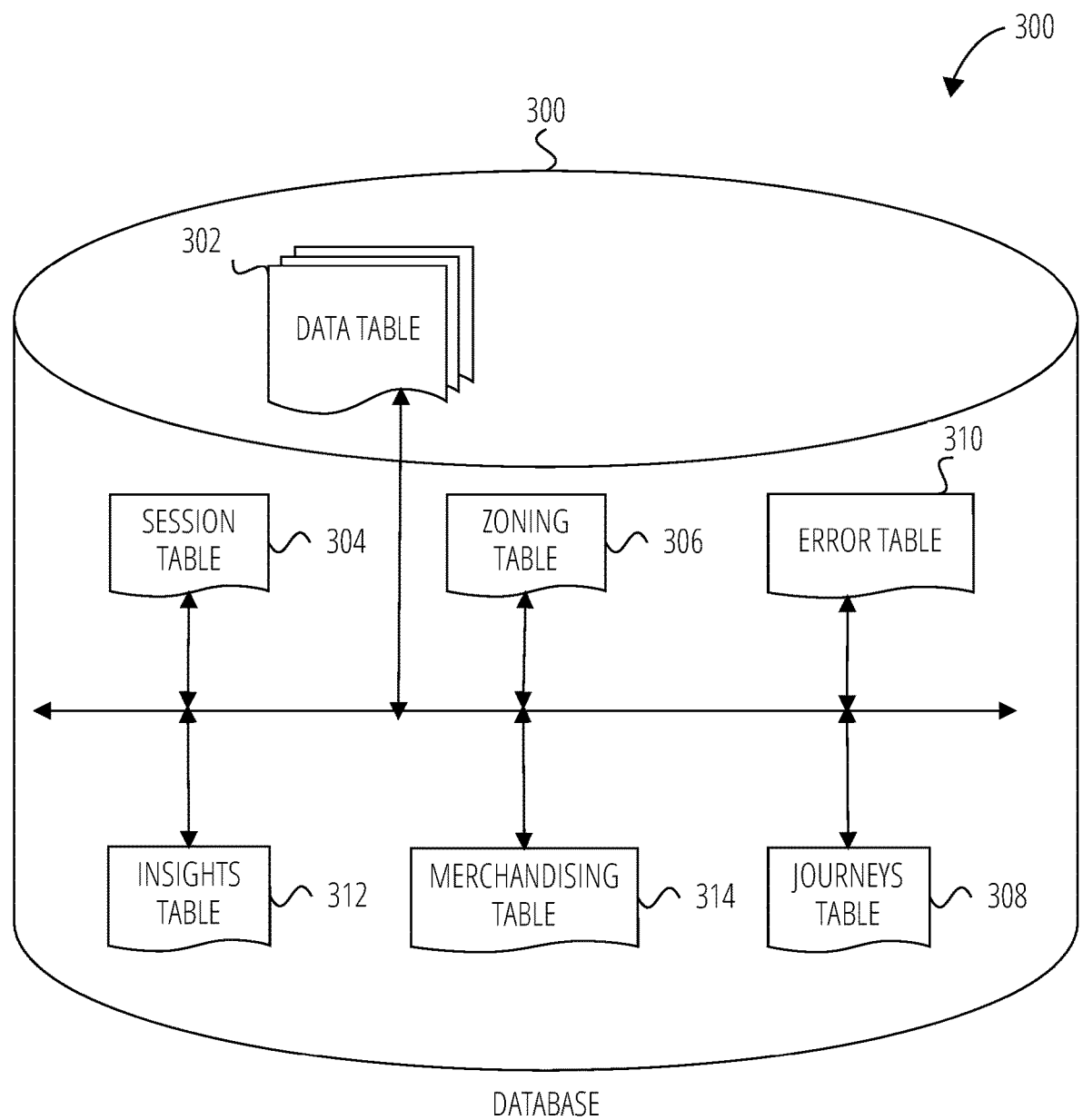
FIG. 3 is a diagrammatic representation of a data structure as maintained in a database, in accordance with some examples.

FIG. 3 is a schematic diagram illustrating the database 300, which may be stored in the database 300 of the experience analytics server 122, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 104, the elements on the website being displayed or visible on the interface of the customer client device 104, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications. Session replays may include session events associated with browsing sessions. In one or more embodiments, session events correspond to user interactions with one or more elements, sections, zones (e.g., stored in association with the zoning table 306 discussed below), or the like, of a webpage. Examples of session events include, but are not limited to, user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session replay and recording may be executed by generating one or more logs, lists, and the like, of such events (e.g., as detected by an experience analytics script 114) included in a webpage accessed by a user of the customer client device 104. Such logs, lists, and the like may be stored in the session table 304, and may include one or more event descriptors including the event type, the event target, such as a specific button or text box, the event time, and the like, as well as combinations thereof.

The zoning table 306 stores data related to the zoning for each of the client's websites and native applications including the zones to be created and the zoning overlay associated with the websites and native applications. The journeys table 308 stores data related to the journey of each visitor to the client's website or through the native application. The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Figure 4:
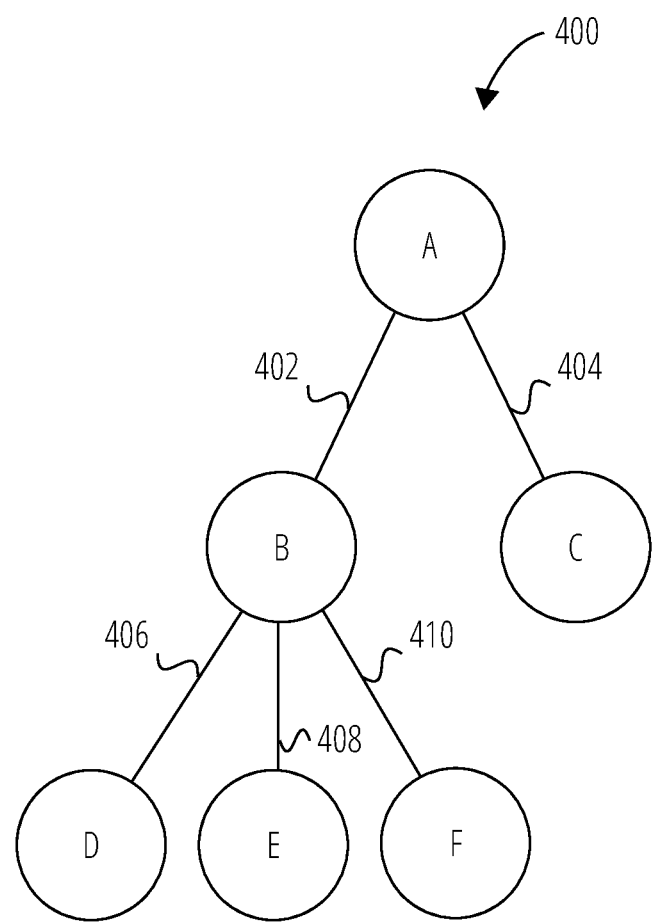
FIG. 4 illustrates an unlabeled document object model (DOM) tree, in accordance with some examples.

FIG. 4 illustrates an unlabeled document object model (DOM) tree 400, in accordance with some examples. In one or more embodiments, the unlabeled DOM tree 400 provides a visual representation of the hierarchical structure of a webpage's HTML code, with content zones or elements (e.g., as defined by the zoning system 206) represented as nodes A-F.

In the example unlabeled DOM tree 400, related nodes A-F are joined by links 402-410, representing the relationships between any two of the nodes A-F. In the example unlabeled DOM tree 400, a link 402 is established between nodes A and B, a link 404 is established between nodes A and C, a link 406 is established between nodes B and D, a link 408 is established between nodes B and E, and a link 410 is established between nodes B and F.

In addition, nodes B and C are disposed on a second tier below the first tier occupied by node A, reflecting a structure in which the content element or zone represented by node A includes the content elements or zones represented by nodes B and C. Moreover, nodes D, E and F are disposed on a third tier below the second tier occupied by node B, reflecting a structure in which the content element or zone represented by node B includes the content elements or zones represented by nodes D, E and F.

Figure 5A:
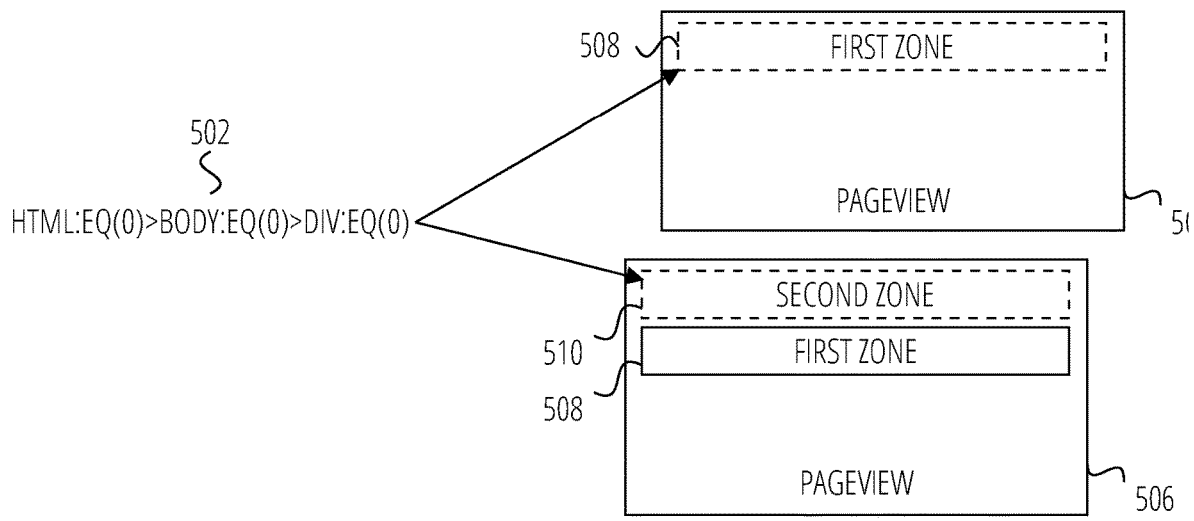
FIG. 5A illustrates a webpage with different pageviews in which a target identifies multiple zones, in accordance with some examples.

FIG. 5A illustrates a webpage with different pageviews in which a target identifies multiple zones, in accordance with some examples. In the example of FIG. 5A, a target 502 identifies a first zone 508 with respect to the pageview 504. In addition, the target 502 identifies a second zone 510 with respect to the pageview 506.

As described herein, a "webpage" corresponds to a URL and its custom variables (hereinafter "cvars"). Thus, the webpage is defined by a host (e.g., "www.example.com"), a path (e.g., "/welcome"), a single query string (e.g., "?gclid=abc&q="123""), and a single set of cvars (e.g., "PageId=Homepage" "Language=en-US" "IsLogged=True").

As described herein, a "pageview" is a single instance of a webpage that a user has seen. In addition, a "page group" is be a collection of webpage(s) matching a list of conditions. By way of non-limiting examples: a page group may include contains 15 webpages, a mapping may include 10 page groups, and a zoning may describe the aggregate behavior of users on particular page group.

As described herein, a "zone" is a webpage feature or element included in the HTML and/or the corresponding DOM of the webpage. As noted above with respect to FIG. 4, a DOM node is a feature of the DOM, where the DOM node corresponds to a given HTML element or zone. Examples of zones in webpages include, but are not limited to, banner advertisements, product images, clickable buttons, and the like.

With respect to identifying zones, a target (e.g., the target 502) refers to an identifier computed for a webpage node, such as an HTML node, or corresponding DOM node. As shown in the example of FIG. 5A, the target 502 is represented as a target path. Target values may be variously-computed based on various webpage properties including, without limitation, tag names, element classes, element order in the DOM tree, specific attributes, and the like, as well as any combination thereof.

As webpages and page groups may include dynamic content (e.g., blocks configured to display banner ads of various sizes), the pageviews of a given webpage or page group may vary between viewing sessions, devices, users, and combinations thereof. Such variance in pageviews may lead to zone target misidentification, resulting in reduced reliability for zone identification information.

One example type of zone target misidentification is a zone existence problem. A zone existence problem corresponds to the existence of a webpage zone which is not rendered for each pageview, but which is treated as having been repeatedly rendered during zone metric analysis. This may lead to skewed zone analysis statistics.

Another example type of zone target misidentification is a One Target Multiple Zones ("OTMZ") problem. An OTMZ problem corresponds to identical targets (e.g., HTML target paths) identifying different zones across multiple pageviews (e.g., identification of a search bar and a home button). FIG. 5A illustrates an example OTMZ problem.

As shown in the example of FIG. 5A, the pageviews 504 and 506 represent different pageviews of the same webpage (e.g., a cart page, home page, and the like), or of the same page group (e.g., product pages). In the pageview 504, the target 502 (e.g., HTML target path) identifies a first zone 508 shown in dotted line for explanatory purposes. On the other hand, in the pageview 506, the same target 502 identifies a second zone 510 shown in dotted line. The second zone 510 is different than the first zone 508. Misidentification of the zone target in this case may lead to unreliable zone analysis with respect to a webpage or page group, for example, with respect to recording of session events corresponding to user interactions, zone metrics, session replay, statistical analysis of collected data, and the like.

Figure 5B:
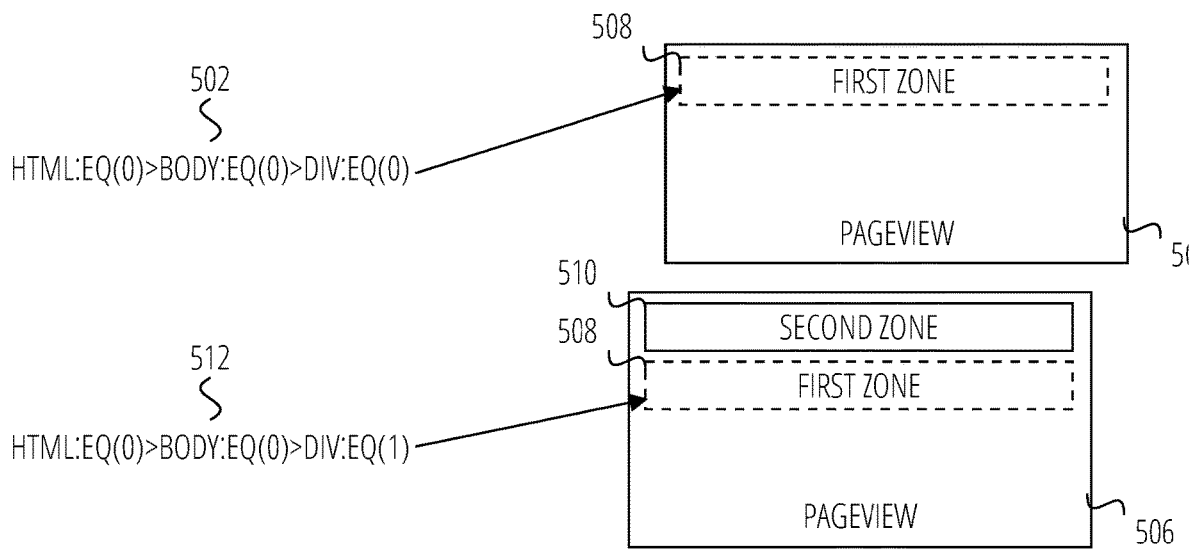
FIG. 5B illustrates a webpage with different pageviews in which a zone is identified by multiple targets, in accordance with some examples.

FIG. 5B illustrates a webpage with different pageviews in which a zone is identified by multiple targets, in accordance with some examples. By way of example, FIG. 5B includes reference numbers (e.g., elements 502-510) also appearing in FIG. 5A. In the examples of FIGS. 5A-5B, the same pageviews 504-506 indicate different types of zone target misidentifications. However, this is not necessarily the case for other pageview arrangements, which may only indicate a single type of zone target misidentification.

As noted above regarding FIG. 5A, one type of zone misidentification is the OTMZ problem. FIG. 5B illustrates another example type of zone target misidentification, namely the One Zone Multiple Targets ("OZMT") problem. An OZMT problem corresponds to the same zone (e.g., a search bar) being separately-targeted, such as by different targets (e.g., target paths) for different pageviews, thus leading to unreliable zone analysis.

As shown in the example of FIG. 5B, for pageview 504, the first zone 508 shown in dotted line is identified by the target 502 (e.g., an HTML target path). For the pageview 506, the first zone 508 shown in dotted line is additionally identified by the target 512. As such, the same zone is identified by multiple targets. Such zone target misidentification may lead to unreliable zone analysis with respect to a webpage or page group, for example, with respect to recording of session events corresponding to user interactions, zone metrics, session replay, statistical analysis of collected data, and the like.

Figure 6:
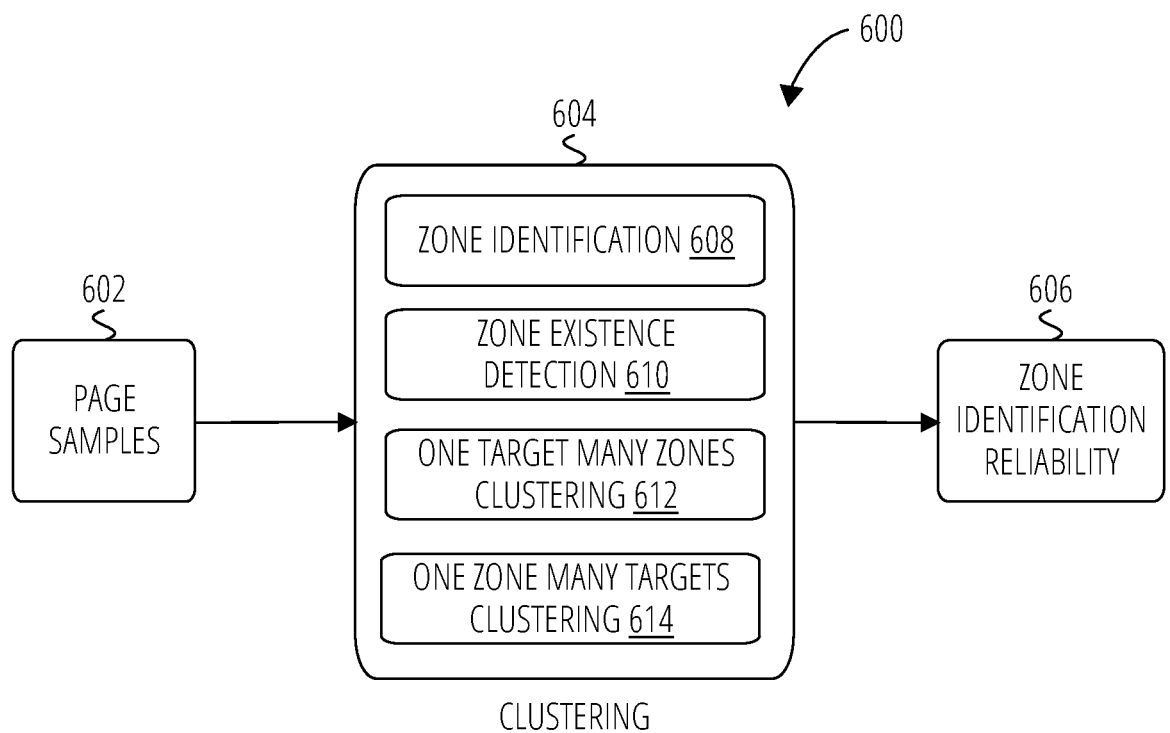
FIG. 6 illustrates an architecture configured to determine zone identification reliability, in accordance with some examples.

FIG. 6 illustrates an architecture 600 configured to determine zone identification reliability, in accordance with some examples. For explanatory purposes, the architecture 600 is primarily described herein with reference to the member client device 102 and the experience analytics server 122 of FIG. 1. However, the architecture 600 may correspond to one or more other components and/or other suitable devices.

As shown in the example of FIG. 6, the architecture 600 provides for a clustering module 604 configured to determine reliability of zone identification information for a webpage or page group. The clustering module 604 is configured to receive page samples 602 of a webpage or page group as input, and to determine zone identification reliability 606 for the webpage or page group.

At a high level, the architecture 600 provides for determining a representative sampling of pageviews for the webpage (e.g., a cart page, home page, and the like) or page group (e.g., product pages). The clustering module 604 includes components 608-614 which are configured to perform clustering and determine zone identification reliability with respect to the page samples 602. In one or more embodiments, the architecture 600 is configured to: determine zone target information based on the page samples 602 (e.g., via the zone identification module 608); detect the existence of webpage or page group zone(s) that are not rendered for pageviews (e.g., via the zone existence detection module 610); perform OTMZ clustering to detect a same target identifying different zones across multiple pageviews (e.g., via the OTMZ clustering module 612); and perform OZMT clustering to detect a same zone being targeted by different targets for different pageviews (e.g., via the OZMT clustering module 614).

Regarding the page samples 602, the architecture 600 is configured to generate datasets for the webpage or page group. For example, each dataset is selected to represent a real life analysis context (e.g., product pages on a specific device in a specific time period). In one or more embodiments, a dataset is selected to include enough variance in its samples to represent the real life variance in a webpage or page group. As such, instead of taking random pageview samples, the architecture 600 is configured to select pageview samples that have different layouts.

As noted above, the experience analytics system 100 provides for storing session events within the session table 304. The session events correspond to user interactions with one or more elements, sections, zones, or the like, of a webpage or page group. The session events may be stored within the session table 304 as logs, lists, and the like, based on event descriptors indicating the event type, the event target, such as a specific button or text box, the event time, and the like, as well as combinations thereof.

The architecture 600 is configured to access the session events stored in the session table 304 in order to generate the datasets corresponding to the page samples 602. For example, the architecture 600 is configured to query the session table 304 based on session events for a page group on a specific device and/or within a specific time period. A user (e.g., administrator) at a member client device 102 may specify the time period and page group via corresponding interfaces provided by the experience analytics server 122 (e.g., the session replay system 208 and/or the zoning system 206).

In response to the query, the architecture 600 is able to generate multiple pages corresponding to the page samples 602. If the query results in a set of page samples that is unsatisfactory (e.g., below a threshold number of page samples), the query may be revised (e.g., by the user) using a different time period to generate a new set of page samples that meets the threshold number of page samples.

As noted above, the clustering module 604 includes the zone identification module 608, which is configured to determine zone target information for each of the page samples 602. In one or more embodiments, for each sample of the page samples 602, the zone identification module 608 is configured to render the webpage or page group, and to execute a script (e.g., a Javascript code) on the rendered page to extract all the information from the DOM tree for the page. As a result, for a given node of the DOM tree, the zone identification module 608 extracts the dimensions, position, html, screenshot and other descriptors (e.g., clickability and visibility) for that node. Thus, the extracted information indicates the zone targets and/or target paths corresponding to the page sample.

Based on the extracted information, the modules 610-614 are configured to detect zone target misidentifications. As noted above for the zone existence detection module 610, a zone existence problem corresponds to the existence of a webpage zone which is not rendered for each pageview, but which is treated as having been repeatedly rendered during zone metric analysis. For example, if a particular zone (e.g., first zone 508) was displayed 100 times across 200 pageviews and was clicked 20 times, the click rate should be 20/100=20%. However, the computed click rate may be incorrectly calculated as 20/200=10%.

The zone existence detection module 610 is configured to detect the existence of webpage zone(s) that are not rendered for pageviews. For example, based on the zone target information as determined by the zone identification module 608, the zone existence detection module 610 may detect the existence of webpage zone(s) that are not rendered (e.g., based on the visibility associated with the zone). The zone identification module 608 is configured to store such indication, for example, in the zoning table 306.

As noted above, a node (e.g., a DOM node) may correspond to a webpage element (e.g., an HTML element or "zone"). Extraction may be performed on a node to identify features including dimensions, position, html, screenshot, clickability and/or visibility. As a target path may include hierarchical information describing the zone or element's relationship to other zones or elements, such as may be graphically depicted in a corresponding DOM tree, analysis of such hierarchical target information may provide for the identification of differences between target paths based on target path content values, despite the paths indicating the same target. Further, an element target path may include one or more data features representing non-structural attributes of the referenced target zone, such as, as examples and without limitation, the node depth in the DOM tree and its order relative to its siblings, whether the target zone or element is of a specific type or class, and the like, as well as any combination thereof. Although only one target may be indicated by a given path (e.g., the target 502 path), the same path may, for various versions of the same webpage or page group, indicate different zones or elements, creating an OTMZ error.

In one or more embodiments, the OTMZ clustering module 612 is configured to perform Single Linkage Clustering (SLC) with respect to the nodes. SLC is a hierarchical clustering algorithm. SLC is based on grouping clusters in bottom-up fashion (e.g., agglomerative clustering), at each step combining two clusters that contain the closest pair of elements not yet belonging to the same cluster as each other.

Figure 7:
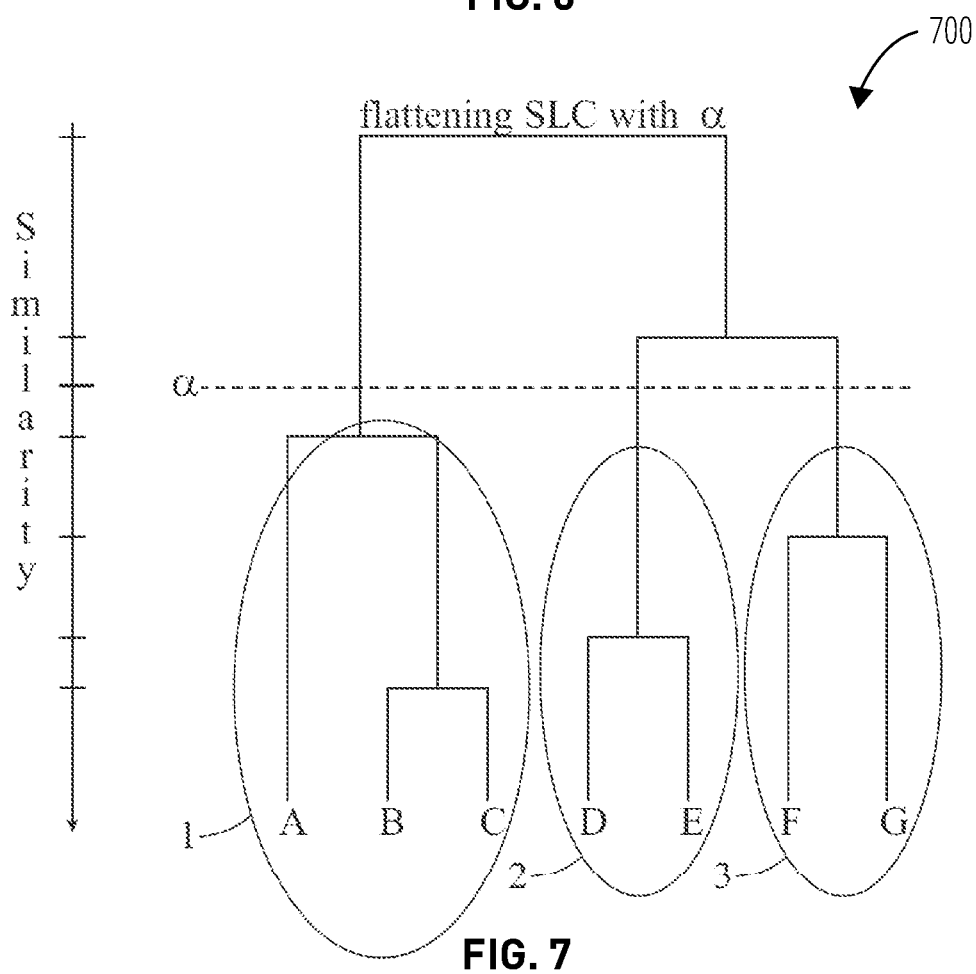
FIG. 7 illustrates example dendrogram in which nodes are grouped into clusters, in accordance with some examples.

As discussed further below with respect to FIG. 7, the SLC results in a dendrogram, which is a diagram representing all the progressive merging steps from the data points (e.g., nodes) to one large cluster. In one or more embodiments, the OTMZ clustering module 612 is configured to flatten the SLC results, for example, by setting a horizontal line at a predefined threshold (e.g., a) with respect to the dendrogram. Based on the horizontal line, it is possible to determine a set of clusters (e.g., 3 clusters as shown in FIG. 7 discussed below).

In one or more embodiments, the value a corresponds to a threshold distance between zones, for assigning zones to clusters. For example, the distance is between an element targeted by a target on a first pageview and the element targeted by the target on a second pageview. Analysis of in-cluster distances, such as between a first clustered node and a second clustered node, may provide for identification of nodes which are similar to, or dissimilar from, other nodes in the same cluster. Outliers, or nodes which are improperly included in a cluster, may be identified by comparison of node distance values with in-cluster distance values, such that, where a given node has a greater similarity to a second cluster than to the first cluster, where the node is included in the first cluster, the node may be identified as properly belonging to the cluster in which the node is not included, indicating that the node may be properly identified as indicating a different target, such as the target relevant to the second cluster.

By way of non-limiting example, the OTMZ clustering module 612 provides that the distance, d, used for SLC is:

$$d(x,y)=1-s(x,y) \qquad \text{Equation 1}$$

In Equation (1), $s(x,y)$ represents the similarity between zones x and y. On this note, $s(x,y)$ is between 0 and 1 and hence so is $d(x,y)$. By way of non-limiting example, the OTMZ clustering module 612 further provides for determining $s(x,y)$ as follows:

$$s(x,y)=[s\_html(x,y)+s\_height(x,y)+s\_width(x,y)+s\_top(x,y)+s\_left(x,y)+s\_depth(x,y)]/6 \qquad \text{Equation 2}$$

With respect to s_html in Equation (2), for each zone, the string between the first "<" and the first ">" is considered, and similarity between those strings is computed. The following corresponds to an example regarding s_html:

<div class: "box"> & <div class: "box">: s_html=1
<div> & <div class: "box">: s_html=(2*3)/(3+16)=0.32
<div class: "box"> & <div class: "box large">: s_html= (2*15+2*1)/(16+22)=0.84

In one or more embodiments regarding the values of s_height, s_width, stop, s_left, s_depth in Equation (2), it is noted that:

if $x==y$:ratio=1 elif $\max(x,y)$:ratio=$\min(x,y)/\max(x,y)$ else: ratio=0

It is noted that above Equations (1) and (2) correspond to examples for determining distance and similarity. Other equations may be employed in lieu of, or as a supplement to Equations (1) and (2).

As shown in the example of FIG. 6, the architecture 600 provides for outputting an indication of the zone identification reliability 606. For example, each of the modules 610-614 is configured to generate, based on its respective analysis, a zone identification issue in cases where a zone misidentification is detected. For example, zone existence detection module 610 is configured to generate a zone identification notification to indicate when a webpage zone is not rendered for each pageview (e.g., with data for the click rate based on the actual number of renderings of the zone, rather than the total number of pageviews). In another example, the OTMZ clustering module 612 is configured to generate a zone identification notification to indicate the presence of multiple clusters for a single target (e.g., with data for the number of zones having the same target). In another example, the OZMT clustering module 614 is configured to generate a zone identification notification to indicate the presence of multiple targets for one zone (e.g., with data for the number of targets having the same zone).

Thus, the OTMZ clustering module 612 is configured to group the dataset by target. This provides for a mini dataset for each target composed of all its occurrences across all pages. Clustering is applied to each mini dataset, so that one cluster corresponds to one zone. In one or more embodiments, for each mini dataset, there are two possible scenarios: (1) all occurrences of a target form one cluster, which means the target refers to the same zone and that the zone identification is reliable (e.g., this does not necessarily mean that this zone is always referred-to by this target); or (2) the target's samples form multiple clusters and the zone identification is not reliable (e.g., since each cluster corresponds to one zone, this means that our target refers to different zones). Indications of reliability may be based on threshold values indicating high or low reliability.

As noted above for the OZMT clustering module 614, an OZMT problem corresponds to identical targets (e.g., HTML target paths) identifying different zones across multiple pageviews (e.g., identification of a search bar and a home button). The OZMT clustering module 614 is also configured to perform SLC together with flattening the SLC results based on a distance threshold a, similar to that discussed above with respect to the OTMZ clustering module 612.

In one or more embodiments, the OZMT clustering module 614 is configured to perform clustering on the whole dataset (e.g., all the zones from all the page samples 602). As noted above, each cluster corresponds to one zone. Thus, for each cluster, there are two possible scenarios: (1) all samples of our cluster have the same target, which means the zone representing this cluster is always referred to by the same target and the zone identification is reliable (e.g., this does not necessarily mean that this target is always referring to this zone and no other); or (2) the cluster's samples are referred to by more than one target and the zone identification is not reliable (e.g., this means that the zone representing this cluster is referred to by more than one target). Indications of reliability may be based on threshold values indicating high or low reliability.

Thus, the clustering module 604 is configured to perform both OTMZ and OZMT clustering with respect to the page samples 602. In one or more embodiments, it is possible to define relations between OTMZ and OZMT as follows: (1) Zone A is always referred to by target X, and target X always refers to Zone A: Equivalence (A↔X); (2) Zone A is always referred to by target X, but sometimes target X refers to zone B in addition to zone A: OTMZ (A,B←X); (3) Target X always refers to zone A, but sometimes zone A is also referred to by target Y in addition to target X: OZMT (A←X,Y); and (4) Zone A is referred to by both target X and target Y, and target X also refers to zone B: OTMZ (A,B←X) and OZMT (A←X,Y).

As shown in the example of FIG. 6, the architecture 600 provides for outputting an indication of the zone identification reliability 606. For example, each of the modules 610-614 is configured to generate, based on its respective analysis, a zone identification issue in cases where a zone misidentification is detected. For example, zone existence detection module 610 is configured to generate a zone identification notification to indicate when a webpage zone is not rendered for each pageview (e.g., with data for the click rate based on the actual number of renderings of the zone, rather than the total number of pageviews). In another example, the OTMZ clustering module 612 is configured to generate a zone identification notification to indicate the presence of multiple clusters for a single target (e.g., with data for the number of zones having the same target). In another example, the OZMT clustering module 614 is configured to generate a zone identification notification to indicate the presence of multiple targets for one zone (e.g., with data for the number of targets having the same zone).

FIG. 7 illustrates example dendrogram 700 in which nodes are grouped into clusters, in accordance with some examples. As noted above, a dendrogram is a diagram representing all the progressive merging steps from the data points (e.g., nodes) to one large cluster.

In the example of FIG. 7, the dendrogram 700 depicts a tree structure at which edges terminate at the nodes A-G. Each of the OTMZ clustering module 612 and the OZMT clustering module 614 is configured to flatten the SLC results, for example, by setting a horizontal line at a distance threshold a with respect to the dendrogram 700. Based on the horizontal line, it is possible to determine a set of clusters. In the example of FIG. 7, clusters 1-3 are identified based on the horizontal line corresponding to the distance threshold a.

Figure 8:
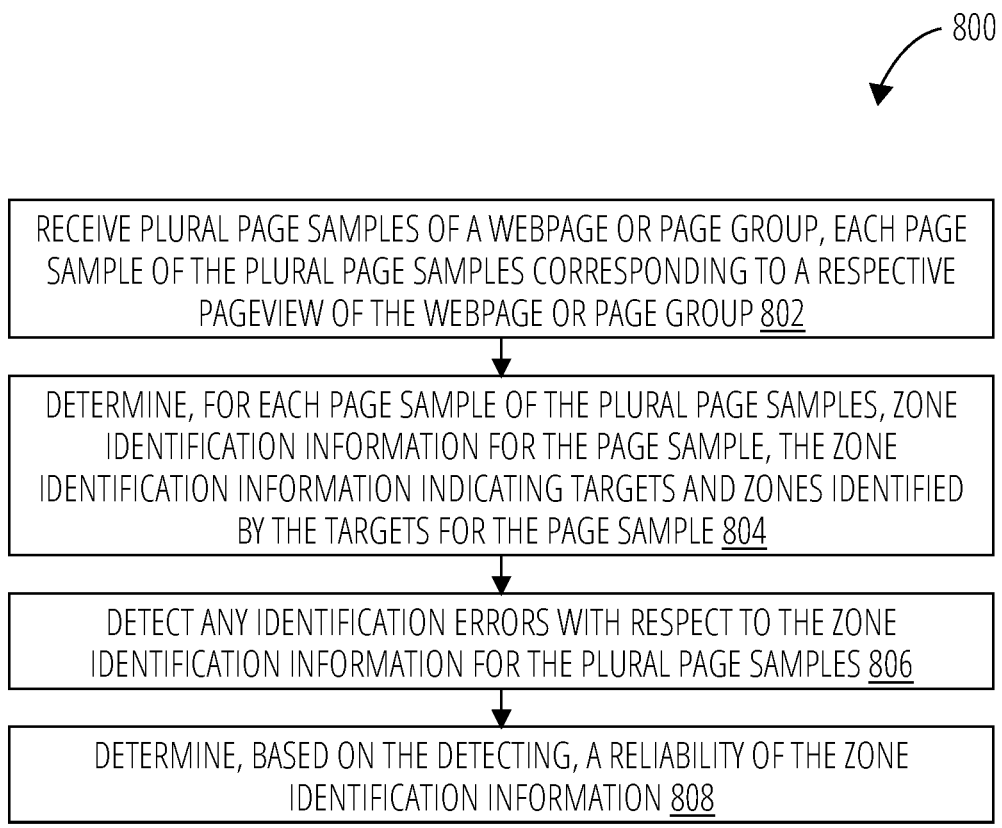
FIG. 8 is a flowchart illustrating a process for determining zone identification reliability, in accordance with some examples.

FIG. 8 is a flowchart illustrating a process 800 for determining zone identification reliability, in accordance with some examples. For explanatory purposes, the process 800 is primarily described herein with reference to the experience analytics server 122 of FIG. 1. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The experience analytics server 122 receives plural page samples of a webpage or page group, each page sample of the plural page samples corresponding to a respective pageview of the webpage or page group (block 802). The plural page samples may correspond to different main states for the page group.

The experience analytics server 122 determines, for each page sample of the plural page samples, zone identification information for the page sample (block 804). The zone identification information indicates targets and zones identified by the targets for the page sample.

The experience analytics server 122 detects any identification errors with respect to the zone identification information for the plural page samples (block 806). The detecting may include performing hierarchical clustering based on the zone identification information for the plural page samples, to generate a tree diagram in which the targets or the zones identified by the targets are arranged in one or more clusters. The reliability of the zone identification information is determined based on the tree diagram. The hierarchical clustering may include single linkage clustering, and the tree diagram may be a dendrogram.

The experience analytics server 122 determines, based on the detecting (e.g., the tree diagram), a reliability of the zone identification information (block 808). The experience analytics server 122 may generate a notification corresponding to the reliability of the zone identification information, and cause display of the notification.

The experience analytics server 122 may determine, based on the zone identification information, a number of times that a respective target is displayed across the plural page samples. Determining the reliability of the zone identification information may be further based on the determined number of times that the respective target is displayed across the plural page samples.

Determining the reliability may include determining a high reliability of the zone identification information, based upon the tree diagram indicating all occurrences of a target forming a single cluster. Alternatively or in addition, determining the reliability may include determining a low reliability of the zone identification information, based upon the tree diagram indicating all occurrences of a target forming multiple clusters.

Determining the reliability may include determining a high reliability of the zone identification information, based upon the tree diagram indicating all samples of a cluster having a same target. Alternatively or in addition, determining the reliability may include determining a low reliability of the zone identification information, based upon the tree diagram indicating all samples of a cluster being referred to by multiple targets.

Machine Architecture

Figure 9:
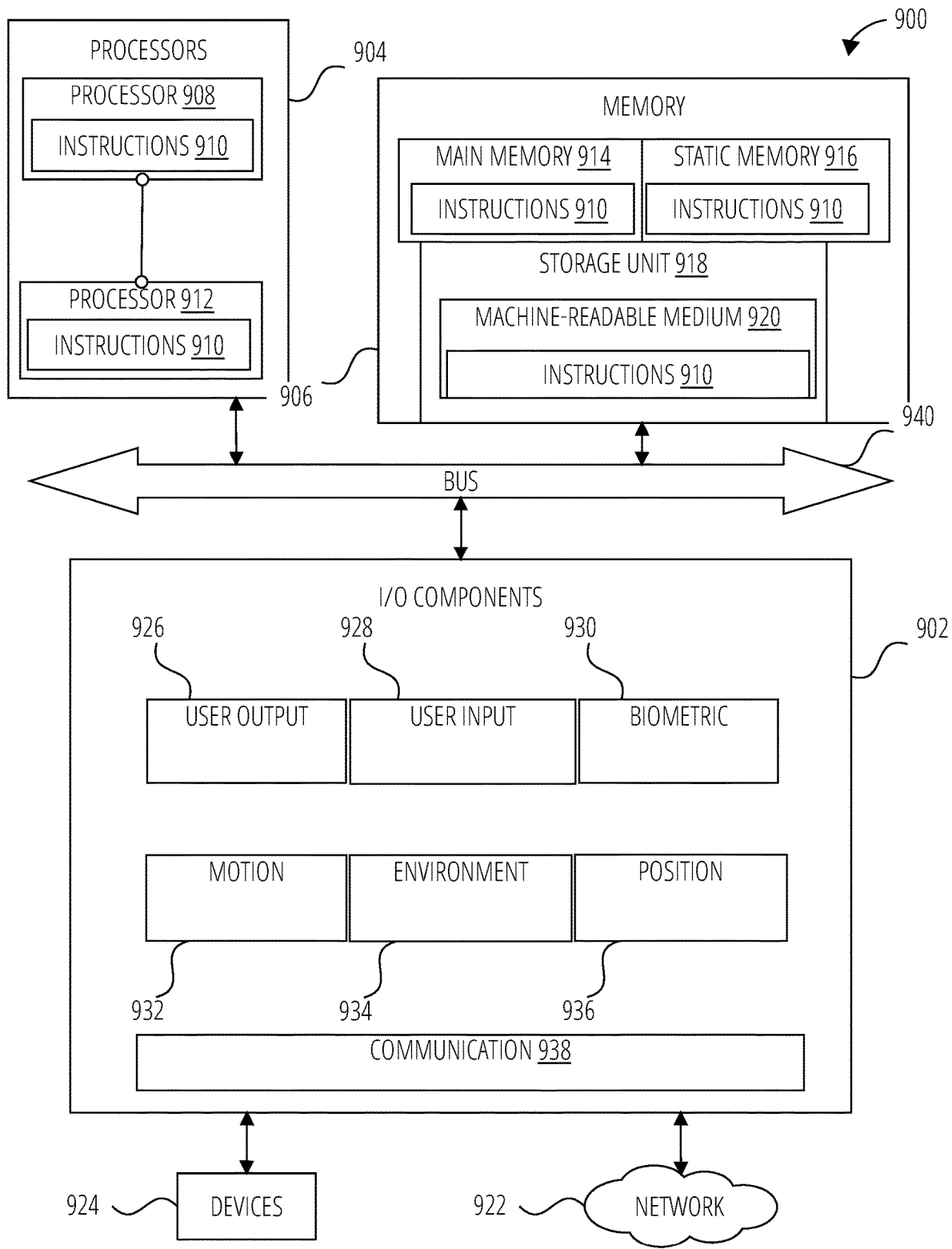
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an application, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the processors 904 or any one of a number of server devices forming part of the experience analytics server 122. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the processors 904 may have a camera system comprising, for example, front cameras on a front surface of the processors 904 and rear cameras on a rear surface of the processors 904. The front cameras may, for example, be used to capture still images and video of a user of the processors 904 (e.g., "selfies"). The rear cameras may, for example, be used to capture still images and videos in a more traditional camera mode. In addition to front and rear cameras, the processors 904 may also include a 360° camera for capturing 360° photographs and videos.

Further, the camera system of a processors 904 may include dual rear cameras (e.g., a primary camera as well as a depth-sensing camera), or even triple, quad or penta rear camera configurations on the front and rear sides of the processors 904. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
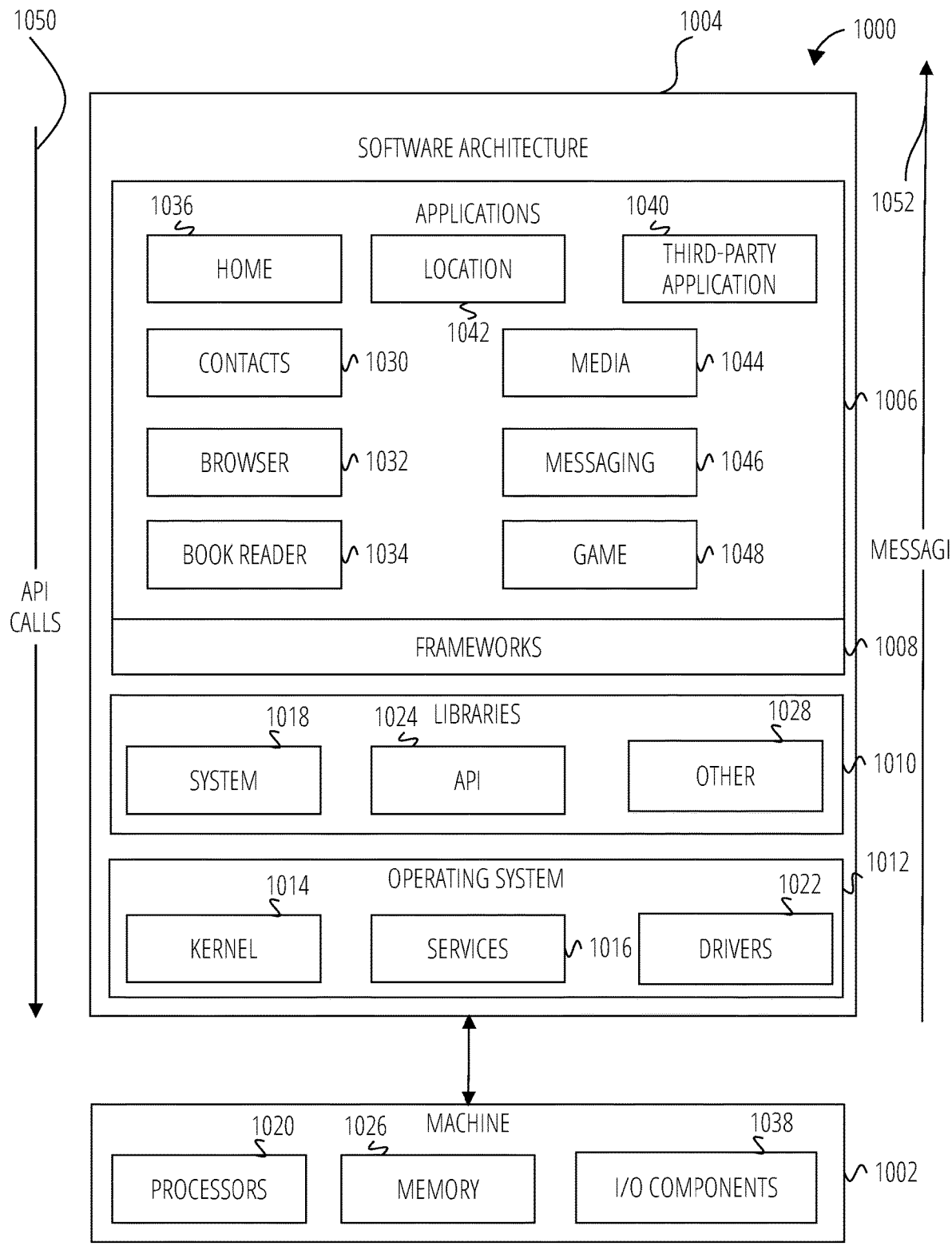
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   receiving plural page samples of a webpage or page group, each page sample of the plural page samples corresponding to a respective pageview of the webpage or page group;
   determining, for each page sample of the plural page samples, zone identification information for the page sample, the zone identification information indicating targets and zones identified by the targets for the page sample;
   performing hierarchical clustering based on the zone identification information for the plural page samples, to generate a tree diagram in which the targets or the zones identified by the targets are arranged in one or more clusters, the hierarchical clustering comprising one target multiple zones (OTMZ) clustering and one zone multiple targets (OZMT) clustering,
   wherein the OTMZ clustering is for detecting a same target identifying different zones across multiple pageviews, and
   wherein the OZMT clustering is for detecting a same zone being targeted by different targets for different pageviews;
   storing a representation of the tree diagram; and
   determining, based on the stored representation of the tree diagram, a reliability of the zone identification information.

2. The method of claim 1, wherein the hierarchical clustering comprises single linkage clustering, and
   wherein the tree diagram comprises a dendrogram.

3. The method of claim 1, wherein determining the reliability comprises:
   determining, in association with the OTMZ clustering, a high reliability of the zone identification information, based upon the tree diagram indicating all occurrences of a target forming a single cluster.

4. The method of claim 1, wherein determining the reliability comprises:
   determining, in association with the OTMZ clustering, a low reliability of the zone identification information, based upon the tree diagram indicating all occurrences of a target forming multiple clusters.

5. The method of claim 1, wherein determining the reliability comprises:
   determining, in association with the OZMT clustering, a high reliability of the zone identification information, based upon the tree diagram indicating all samples of a cluster having a same target.

6. The method of claim 1, wherein determining the reliability comprises:
   determining, in association with the OZMT clustering, a low reliability of the zone identification information, based upon the tree diagram indicating all samples of a cluster being referred to by multiple targets.

7. The method of claim 1, wherein the plural page samples correspond to different main states for the page group.

8. The method of claim 1, further comprising:
   generating a notification corresponding to the reliability of the zone identification information; and
   causing display of the notification.

9. The method of claim 1, further comprising:
   determining, based on the zone identification information, a number of times that a respective target is displayed across the plural page samples, wherein determining the reliability of the zone identification information is further based on the determined number of times that the respective target is displayed across the plural page samples.

10. A system comprising:

a processor; and a memory storing instructions that, when executed by the processor, configure the processor to perform operations comprising:

receiving plural page samples of a webpage or page group, each page sample of the plural page samples corresponding to a respective pageview of the webpage or page group;

determining, for each page sample of the plural page samples, zone identification information for the page sample, the zone identification information indicating targets and zones identified by the targets for the page sample;

performing hierarchical clustering based on the zone identification information for the plural page samples, to generate a tree diagram in which the targets or the zones identified by the targets are arranged in one or more clusters, the hierarchical clustering comprising one target multiple zones (OTMZ) clustering and one zone multiple targets (OZMT) clustering, wherein the OTMZ clustering is for detecting a same target identifying different zones across multiple pageviews, and wherein the OZMT clustering is for detecting a same zone being targeted by different targets for different pageviews;

storing a representation of the tree diagram; and determining, based on the stored representation of the tree diagram, a reliability of the zone identification information.

11. The system of claim 10, wherein the hierarchical clustering comprises single linkage clustering, and wherein the tree diagram comprises a dendrogram.

12. The system of claim 10, wherein determining the reliability comprises:

determining, in association with the OTMZ clustering, a high reliability of the zone identification information, based upon the tree diagram indicating all occurrences of a target forming a single cluster.

13. The system of claim 10, wherein determining the reliability comprises:

determining, in association with the OTMZ clustering, a low reliability of the zone identification information, based upon the tree diagram indicating all occurrences of a target forming multiple clusters.

14. The system of claim 10, wherein determining the reliability comprises:

determining, in association with the OZMT clustering, a high reliability of the zone identification information, based upon the tree diagram indicating all samples of a cluster having a same target.

15. The system of claim 10, wherein determining the reliability comprises:

determining, in association with the OZMT clustering, a low reliability of the zone identification information, based upon the tree diagram indicating all samples of a cluster being referred to by multiple targets.

16. The system of claim 10, wherein the plural page samples correspond to different main states for the page group.

17. The system of claim 10, the operations further comprising:

generating a notification corresponding to the reliability of the zone identification information; and causing display of the notification.

18. A non-transitory computer-readable storage medium, the computer-readable storage medium including instructions that when executed by a computer, cause the computer to perform operations comprising:

receiving plural page samples of a webpage or page group, each page sample of the plural page samples corresponding to a respective pageview of the webpage or page group;

determining, for each page sample of the plural page samples, zone identification information for the page sample, the zone identification information indicating targets and zones identified by the targets for the page sample;

performing hierarchical clustering based on the zone identification information for the plural page samples, to generate a tree diagram in which the targets or the zones identified by the targets are arranged in one or more clusters, the hierarchical clustering comprising one target multiple zones (OTMZ) clustering and one zone multiple targets (OZMT) clustering, wherein the OTMZ clustering is for detecting a same target identifying different zones across multiple pageviews, and wherein the OZMT clustering is for detecting a same zone being targeted by different targets for different pageviews;

storing a representation of the tree diagram; and determining, based on the stored representation of the tree diagram, a reliability of the zone identification information.

* * * * *

UNITED STATES PATENT AND TRADEMARK OFFICE
CERTIFICATE OF CORRECTION

| | | |
|---|---|---|
| PATENT NO. | : 11,947,573 B2 | Page 1 of 1 |
| APPLICATION NO. | : 17/877707 | |
| DATED | : April 2, 2024 | |
| INVENTOR(S) | : Baatout et al. | |

It is certified that error appears in the above-identified patent and that said Letters Patent is hereby corrected as shown below:

In the Specification

In Column 6, Line 14, delete "118" and insert --124-- therefor

In Column 8, Line 43, delete "web site" and insert --website-- therefor

In Column 15, Line 14, delete "a)" and insert --α)-- therefor

In Column 15, Line 18, delete "a" and insert --α-- therefor

In Column 15, Line 56, delete "stop," and insert --s_top,-- therefor

In Column 16, Line 41, delete "a," and insert --α,-- therefor

In Column 17, Line 35, delete "a" and insert --α-- therefor

In Column 17, Line 39, delete "a." and insert --α.-- therefor

In Column 19, Line 39, delete "906," and insert --914,-- therefor

Signed and Sealed this
Thirty-first Day of December, 2024

Derrick Brent
*Acting Director of the United States Patent and Trademark Office*